United States Patent Office 2,961,462
Patented Nov. 22, 1960

2,961,462

DIBASIC ACID TREATING PROCESS

Harry Chafetz, Poughkeepsie, N.Y., assignor to Texaco Inc., a corporation of Delaware No Drawing. Filed Dec. 24, 1957, Ser. No. 704,890

7 Claims. (Cl. 260—537)

The instant invention relates to separation of related and extraneous substances from $C_{4+}$ dibasic acids of the oxalic acid series, and to purification of these acids.

Dibasic acids of this homologous series are succinic, glutaric, adipic, pimelic, suberic, azelaic, sebacic, and higher ones of the formula $(CH_2)_n(COOH)_2$ where $n$ is an integer having a value of at least 2. Esters of these acids are useful as plasticizers, synthetic lubricants and the like. They are useful in mixtures or as individual compounds. Adipic, used in the manufacture of nylon 66, is particularly commercially important. Separation of related and extraneous substances from these dibasic acids generally enhances their value.

In one aspect of my invention I have found that I can remove succinic anhydride effectively from a mixture thereof containing succinic anhydride and one or more $C_{4+}$ dibasic acids of the oxalic acid series, i.e., succinic acid, glutaric acid, adipic acid, etc. alone or in mixtures with each other and higher homologous acids, by the process which comprises lixiviating said mixture with liquid phase $SO_2$, and separating the resulting lixivium containing succinic anhydride from the remaining solid phase material containing said dibasic acid (or acids in the event that more than one remains in the residue). In addition to removing succinic anhydride from the mixture, various non-carboxylic oxygenated impurities which may be present are removed with the anhydride and there results a white, free-flowing crystalline mixture of higher dibasic acids. Should a substantial fraction of such oxygenated impurities be present, the effectiveness of the lixiviation with sulfur dioxide is dramatic, and the process is especially valuable.

The lixiviation of the mixture of succinic anhydride with one or more of these dibasic acids can be done in a single treatment, a series of treatments, or a continuous operation such as a continuous countercurrent extraction similar to that employed, for example, in the purification of precipitated chalk and the like. Ordinarily the weight ratio of liquid sulfur dioxide to total mixture containing succinic anhydride will be between about 1:1 and about 20:1, but more or less sulfur dioxide can be used depending upon the proportion of impurities present, the proportion of succinic anhydride present, and the degree of residual dibasic acid purity desired. In the ordinary instance, I find that a single treatment of a mixture from the usual sources with about 1–10 times the weight of liquid sulfur dioxide is adequate for producing a crystalline dibasic acid fraction of high purity. However, in large scale operation a series of lixiviations can be used for overall economy of sulfur dioxide.

Advantageously, the lixiviating operation is done at a temperature between about minus 30° and about plus 100° F., but temperature as low as minus 50° F. or lower or as high as about plus 200° F. can be used. Superatmospheric pressure vessels are used when operating at temperature above the atmospheric boiling point of sulfur dioxide (14° F.). For efficiency and economy lixiviation at about plus 14° F. and atmospheric pressure (with refluxing sulfur dioxide) is preferred.

Most processes producing dibasic acids make actually a complex crude mixture containing, in addition to a fairly wide spectrum of the above-mentioned dibasic acids, a variety of contaminants e.g. monocarboxylic acids, especially $C_{1-10}$ monobasic acids and associated contaminants having non-carboxylic oxygen. These are generally objectionable because they give the crude a bad odor and a dark color, and they can be difficult to remove cheaply by conventional methods. Typical kinds of such associated contaminants are alcohols, ketones, lactones, nitrated hydrocarbons, tars, aldo acids, keto acids, esters, and hydroxy acids.

A crude mixture of succinic, glutaric, and adipic acids and significant quantities of higher dibasic acids of the oxalic acid series (in most instances) can be made in a number of ways, for example, by oxidation of paraffinic and/or isoparaffinic hydrocarbons, e.g., refined wax, semi-refined wax, petrolatum, lubricating oil, slack wax, scale wax, foots-oil and the like, with air, hydrogen peroxide, nitric acid, chromic acids, ozone, or a mixture or a succession of these oxidizing agents. The preferred crude dibasic acid mixture is made by two-stage process wherein a macrocrystalline paraffin wax is oxidized with air, usually in the presence of a metalliferous oxidation catalyst such as a manganese salt, until the saponification number of the mixture reaches at least 200 and, advantageously, 300 and 600; thereafter the air oxidate is agitated intensively with nitric acid at a temperature between 180° and 450° F. for at least about one minute.

Alternatively, the wax can be oxidized in a single stage with air or other oxygen-containing gas, and the bulk of the dibasic acids extracted from the oxidate with water, or a lower molecular weight (e.g., $C_1-C_3$) alkanol, or an aqueous solution of mineral acid such as hydrochloric, sulfuric, or the like (and subjected to acid hydrolysis to break up esters, if desired). Metal salts can be removed from the aqueous extract solution as hereinafter described, and the water or other solvent removed to leave a dark-colored residue of crude dibasic acids suitable for treatment by my process.

Other ways of making such useful crude mixtures containing one or more of said dibasic acids are: oxidation of levulinic acid with molecular oxygen in the presence of a metalliferous oxidation catalyst; oxidation of ketones such as cyclohexanone with nitric acid; oxidation of alcohols such as cyclohexanol with nitric acid; oxidation of cycloparaffins such as cyclopentane with nitric acid, oxidation of unsaturated fatty acids such as oleic acid, cotton seed fatty acid, or linseed fatty acid or their glycerides with nitric acid or ozone; oxidation of Fisher-Tropsch and oxo products, e.g., with nitric acid; and oxidation of hydroxy acids such as hydroxy stearic acid or glycerides thereof with nitric acid.

In the preferred dibasic acid preparation an aqueous phase containing practically all the dibasic acids separates by gravity from an oily phase after the nitric acid oxidation step. Weight proportions of specific dibasic acids in this aqueous layer is approximately as follows:

20 to 35% succinic ($C_4$); 15 to 25% glutaric ($C_5$); 15 to 25% adipic ($C_6$); 5 to 15% pimelic ($C_7$); and 5 to 25% suberic ($C_8$) and higher. Substantially all the water and nitric acid can be removed from this aqueous layer containing the dibasic acids by distillation, preferably at reduced pressure of about 300 mm. Hg absolute. This also removes lower molecular weight monobasic acids and leaves a dark-colored residue (frequently oily at room temperature) of crude dibasic acids contaminated principally with materials having non-carboxylic oxygen.

In the practice of my invention it is advantageous to remove metal ions which could otherwise be retained in and contaminate certain dibasic acid products. One way to remove metal ions is to treat an aqueous solution of the dibasic acid material for subsequent processing with a cation exchange resin such as sulfonated coal or a sulfonated copolymer of styrene and polyvinylbenzene or the like, e.g., Amberlite IR–120 made by the Rohm and Haas Company or Dowex 50 made by the Dow Chemical Company.

While the foregoing lixiviation of succinic anhydride can be used regardless of how said succinic anhydride was made or how it occurred in the mixture, a particular embodiment of my invention is a three-stage operation wherein succinic acid in a crude dibasic acid mixture such as the one obtained from the foregoing preferred source, i.e., air and nitric acid oxidation of hydrocarbon, is first converted into succinic anhydride by a distillation process. A solid phase mass of succinic anhydride and higher molecular weight (e.g., glutaric, adipic, etc.) dibasic acids is recovered from the resulting distillation residue. This recovered solid phase mass is lixiviated with liquid sulfur dioxide to remove the anhydride. Surprisingly, in the first stage of this embodiment of my invention the succinic acid is converted into its cyclic anhydride selectively from all the other dibasic acids present, particularly glutaric which is also capable of forming a cyclic anhydride.

In this embodiment of my invention, I form a distilland of a mixture of succinic acid with higher dibasic acids of the oxalic acid series of the formula

HOOC—(CH$_2$)$_m$—COOH where $m$ is an integer having a value of at least 3, and an inert, water-immiscible, liquid phase, water-entraining agent; maintain distillation of the entraining agent and water from the distilland at a temperature between about 175° and about 220° C. until evolution of water from the said distilland substantially ceases (thereby indicating that virtually all if not all the succinic acid initially present in the distilland has been converted into succinic anhydride).

The mixture of succinic acid and higher dibasic acids of the oxalic acid series is mixed with the water-entraining agent, usually in a ratio of about 1 to 7 parts of water-entraining agent by weight per part of liquid mixed dibasic acids, but higher and lower proportions can be used, if desired, the minimum proportion being that necessary to protect the distilland from local overheating during the distillation. Use of a proportion of water-entraining agent substantially above about 7 adds to the cost of the process without significant advantage. Using a mixture of crude dibasic acids from the preferred source, i.e., that from the air and nitric acid oxidation of paraffinic hydrocarbon, I prefer to use about 2 to 5 parts by weight of water-entraining agent per part of crude mixed acids. Undissolved components will remain in the disilland under these conditions, but they are innocuous in my process. Should they tend to give uneven boiling and some bumping, these conditions can be alleviated by use of mechanical agitation of the distilland. Such agitation also assists in preventing local overheating.

Simple cooling of the remaining distilland, after the water-entraining distillation, to about room temperature or below, e.g., to a temperature from minus 20 to plus 100° F., and preferably about 60° F., is convenient for recovery of the solid phase mass of succinic anhydride and the associated solids by crystallization. Higher and lower temperatures, of course, can be used providing that the water-entraining agent remains liquid. When very impure dibasic acids have been used for the distillation, a dark, sometimes gummy and sometimes oily material insoluble in the water-entraining agent frequently forms. This material, which contains most of the mineral matter originally present in the dibasic acids, can be separated from the distilland by either filtration or decantation at a temperature slightly below the boiling point of the water-entraining agent.

Frequently it is advantageous to strip away a little of the water-entraining liquid for concentrating the distillation residue containing the dibasic acids. This can be done by conventional distillation, vacuum distillation, and/or a stripping distillation with an entraining permanent gas such as nitrogen. In such case temperature of the concentrated distilland should not be permitted to go above about 220° C. to guard against substantial decarboxylation or other degradation of the dibasic acids in the stripped residue. Additionally, particularly when operating on crude dibasic acids from the preferred source, corelation of solvent proportion and crystallizing temperature concentration to about 40% solids and cooling to about 120° F., can be used to effect partially selective crystallization, i.e., a type of fractional crystallization, e.g., of a predominantly succinic anhydride crystal crop containing a comparatively small proportion of higher molecular weight dibasic acids.

Alternatively, such concentration can be extended, particularly when using a low-boiling water-entraining agent such as benzene, chloroform, or toluene, and the higher molecular weight dibasic acids can be the result of distilling off and/or evaporating the water-entraining agent practically entirely to leave a residue of the solids for lixiviation.

The solid phase mass of succinic anhydride and higher molecular weight dibasic acids is readily separated from the cooled distillation residue by filtration, settling, centrifuging or the like. The crystalline solids can be washed with chloroform or a light hydrocarbon solvent such as mixed hexanes, petroleum ether, or the like to remove traces of water-entraining agent mother liquor preparatory to the liquid SO$_2$ lixiviation, then dried, if desired. In some instances it is advantageous to operate a concentrating distillation on the first filtrate for recovery of a further crop of mixed crystalline dibasic acids and associated substances. Such crystal cropping operation can be repeated one or more times.

The water-entraining agent for operation at atmospheric pressure must have a boiling point in the range of 175–220° C. However, lower boiling entraining agents can also be used providing that sufficient pressure is maintained in the distilling operation to maintain distilland temperature at 175–220° C. In any case the water-entraining agent is an inert, hydrophobic organic liquid capable of dissolving succinic acid to form a solution of at least about 5 grams of that acid per 100 grams of said agent at temperature in the range of 175° to 220° C. Additionally, it should not dissolve substantially more than about one gram of water per 100 grams of solvent at room temperature and pressure, e.g., at atmospheric pressure and 70° C.

Inertness of the water-entraining agent is an important consideration in the practice of my invention. Such agent should not be an amine or an alcohol (which would react with the dibasic acid mixture) or an ester (which could lead to transesterification). Of the high boiling agents, those having aromatic nuclear structure appear to be specially suitable for the general practice of my process. The most suiatble and so preferred specific inert water-entraining agents for the practice of my process are halohydrocarbons such as one or a mixture of chlorobenzenes, chlorotoluenes, chloroethylbenzenes, and chloroethyltoluenes; ethers such as cresyl methyl ethers, cresyl ethyl ethers, and cresyl benzyl ethers; and hydrocarbons such as one or a mixture of diethylbenzenes, butylbenzenes, amylbenzene, and tetralin. Other types of water-entraining agents which are satisfactory are monobasic acids e.g., valeric acid, diethylacetic acid, caporic acid (although their odor makes them less desirable than the foregoing agents). I can also use aliphatic or aromatic nitriles such as benzonitrile, caprylic acid nitrile, tolunitriles. Aliphatic and aromatic nitrohydrocarbons are also suitable, e.g., nitrobenzene, nitropentane, and the like. Distilling with distilland temperature substantially below about 175° C. is not sufficient to produce succinic anhydride at any appreciable rate. Use of distilland temperature substantially above 220° C. tends to give degradation products and/or decarboxylation of dibasic acids present.

Suitable lower boiling water-entraining agents useful in the practice of my process under superatmospheric pressure to attain the desired temperature range are one or more halohydrocarbons such as chloroform, dichloromethane, dichloroethane, dichloropropane, chlorbutane, and dichlorobutane; one or more hydrocarbons such as benzene, toluene, xylene, ethylbenzene, and cumene; and ethers and chloroethers such as propyl ether, $\beta$-chloroethyl ether, butyl ether, anisole, and ethyl propyl ether. The water insolubility of the entraining agent permits one to condensate the distillate, separate water from the condensate practically completely, e.g., by gravity settling, and reflux the entraining agent to the distilland for eventual exhaustion of free water therein.

In my process it is important to take overhead the water and the entraining agent to the substantial exclusion of succinic anhydride and succinic acid. This can be done very simply by rectifying the distillate very slightly in atmospheric pressure operation, ordinary wall effects of a long vapor tube being adequate in the normal instance, but packing etc., and reflux also permissible in a column. Using a low-boiling water-entraining agent such as benzene under superatmospheric pressure is also suitable for removing water without rectification but yet substantially exclusively to any succinic anhydride and succinic acid because the mol fraction of succinic anhydride and succinic acid in the vapor phase is very minute under elevated pressure.

When the proportion of liquid sulfur dioxide to solid phase mass of precipitated succinic anhydride and higher molecular weight dibasic acids (precipitated from the distillation residue of the water-entraining step) is at least about 3:1 by weight and preferably 5:1 to 10:1 when operating on preferred source material, the oxygenated impurities and succinic anhydride are substantially completely extracted into the liquid sulfur dioxide, thereby leaving a free-flowing white crystalline $C_{5+}$ dibasic acid fraction of high purity.

Suitable materials of construction of my process are corrosion resistant, e.g., glass, glass-lined steel, an austenitic stainless steel or the like.

In the sulfur dioxide lixiviation mechanical agitation is preferred. The extract fraction (lixivium) is separated from the insoluble fraction of purified $C_{5+}$ dibasic acids by filtration, decanting, or centrifuging. Purified in soluble $C_{5+}$ dibasic acids can be rinsed with a small amount of additional sulfur dioxide to remove occluded liquors. Retained sulfur dioxide can be removed most simply from the insoluble crystalline remainder by allowing it to warm at room temperature and atmospheric pressure. The purified $C_{5+}$ dibasic acids, predominantly adipic acid, can be further fractionated by conventional methods, e.g., by fractional crystallization from solvents such as orthodichlorobenzene, ethyl acetate or the like, if necessary or desired.

The following examples show ways in which my invention has been practiced but should not be construed as limiting the invention. All parts indicated are parts by weight and all percentages are weight percentages unless otherwise noted.

*Example 1*

The following table illustrates the selectivity of liquid $SO_2$ for separating succinic anhydride form glutaric and adipic acids. In each instance the dibasic acid and succinic anhydride was refluxed with the indicated quantity of liquid $SO_2$ for at least 20 minutes, then filtered through a coarse fritted glass filter. The residue of $SO_2$ insoluble material was further extracted with liquid $SO_2$ in the same manner.

| Composition of Solid Mixture To Be Extracted | | | Extraction No. | Wt. of $SO_2$ Used, Grams | $SO_2$-Solubles | | | | $SO_2$-Insolubles | | |
|---|---|---|---|---|---|---|---|---|---|---|---|
| Succinic Anhydride, Grams | Glutaric Acid, Grams | Adipic Acid, Grams | | | Weight, Grams | Neut. No. | | Composition, Min. Percent Succinic Anhydride | Weight, grams | Neut. No. | |
| | | | | | | See Footnote (a) | See Footnote (b) | | | See Footnote (a) | See Footnote (b) |
| 20.0 | | 10.0 | 1 | 144 | 18.6 | 1103 | 945 | 95 | | | |
| | | | 2 | 144 | 1.4 | 1032 | 902 | 75 | | | |
| | | | 3 | 144 | 0.3 | 876 | | 31 | 9.7 | | 768 |
| 10.0 | 10.0 | | 1 | 70 | 9.1 | 1107 | 947 | 95 | | | |
| | | | 2 | 70 | 1.1 | 1052 | 935 | 74 | 9.8 | 851 | 846 | a For determining this neut. no., the sample was weighed, hydrolyzed by heating with water, then titrated. This method gives the following neut. nos.: succinic anhydride, 1122; succinic acid, 950; glutaric acid, 849; adipic acid, 767; pimelic acid, 700; and suberic acid, 644.
b For determining this neut. no., the material was hydrolyzed with hot water and then stripped to dryness before weighing the sample for titration. This method gives the same neut. nos. as described in footnote (a) except for succinic anhydride which has a neut. no. of 950 by this method.

The neutralization numbers of the $SO_2$-solubles and $SO_2$-insolubles in the foregoing table indicate a very sharp separation of the succinic anhydride from the dibasic acids.

*Example 2*

A distilland for the dehydrating distillation was formed by mixing 50 grams of succinic acid with 196 ml. of orthodichlorobenzene. The apparatus used was a flask fitted with a thermometer well, this flask connected to an efficient fractionating column, condenser, and receiver. Condensate from the distillation was subjected to the separating treatment hereinafter described. Fractional distillation was conducted using a 2 to 1 reflux ratio. A total of 50 ml. of distillate was collected, the distillate temperature being in the range of 84–178° C., the distilland temperature ranging from 185–189° C. Discrete liquid water was separated from this distillate. The distilland was cooled to 10° C. and 43 grams (air-dry) of white, needle-shape crystals were recovered by filtration and drying. The crystals were composed of 86% succinic anhydride and 17% succinic acid. This represents an 85% conversion of the succinic acid to the anhydride in the distilling operation.

The selectivity of my process for converting succinic acid, to the exclusion of glutaric acid, into an anhydride was demonstrated by distilling a mixture of 150 ml. of orthodichlorobenzene and 12 grams of glutaric acid in the same manner as described in Example 2. The distillate temperature was 180–185° C. and the distilland temperature was 185° C. A total of 50 ml. of distillate was collected. No water separated from the distillate nor was the distillate temperature sufficiently low to indicate that any appreciable quantity of water being distilled.

The glutaric acid was recovered almost quantitatively from the distilland by cooling to about 50° C. and filtering.

*Example 3*

A mixture of 25 grams of succinic acid, 25 grams of adipic acid, and 182 ml. of orthodichlorobenzene was distilled in the manner described in Example 2. A total of 60 ml. of distillate was collected, the distillate temperature range being 71–183° C. while the distilland temperature range was 187–195° C. A total of 3.4 ml. of water (89% of the theoretical amount to be given off by conversion of 25 grams of succinic acid to its anhydride) was separated off the distillate and collected as discrete liquid water from this distillate. The distilland was cooled to about 20° C. and filtered of 44.4 grams (after air-drying) of white crystalline solids. Six grams of these solids were extracted with 87 grams of liquid $SO_2$ refluxing at atmospheric pressure. The $SO_2$-insoluble material after the extraction weighed 3.3 grams and had a neutralization number of 792, determined according to method (b) in the foregoing table. This indicated that said $SO_2$-insoluble material was at least 87–93% adipic acid. The $SO_2$ extract solution separated from the $SO_2$-insoluble material was stripped of $SO_2$ to yield 2.7 grams of crystals. These crystals had a neutralization number of 1114 by method (a) described in the foregoing table which indicated that the $SO_2$-solubles comprised at least 95% succinic anhydride.

*Example 4*

A mixture of 25 grams of succinic acid, 20 grams of glutaric acid, 20 grams of adipic acid, and 200 ml. of orthodichlorobenzene was subjected to distillation in a manner described in Example 2 except that a column packed with glass helices was used instead of a concentric tube fractionating column. A total of 25 ml. of distillate was collected over a distillate temperature range of 97–176° C., the distilland temperature range being 178–180° C. in this period. The distilland was cooled to about 25° C. and filtered to yield 57.4 grams of white, crystalline solids. A portion, 20 grams, of these solids was extracted with 50 grams of liquid $SO_2$ refluxing at atmospheric pressure. The $SO_2$ extract solution was separated from the resulting $SO_2$-insolubles, then this extract was stripped of $SO_2$ at room temperature to yield 3.6 grams of crystals. The neutralization numbers of the $SO_2$-soluble crystals recovered from the extract were 1108 by method (a), above, and 948 by method (b), above; this indicated that the recovered crystals contained at least 92% succinic anhydride.

*Example 5*

The mixture of crude dibasic acids used here was prepared by the further oxidation of air-oxidized wax (having a saponification number of 504 and oxidized in the presence of a manganese catalyst) with 8.02 parts of 10.6% nitric acid per part of air-oxidized wax oxidate using a temperature of 305–355° F. The aqueous phase of the reaction product was stripped of water, nitric acid, and other low boiling components at a pressure below 300 mm. Hg absolute to leave a brownish, somewhat oily, crystalline residue. This residue of very crude dibasic acids was dissolved in water and the solution passed through a column of the hydrogen form of Amberlite IR-120 cation exchange resin to remove impurities. A mixture of crude, yellowish crystalline dibasic acids was recovered from the ion-exchanged effluent by stripping said effluent at atmospheric pressure at a temperature of about 195° F. This mixture analyzed: 33% succinic acid, 19% glutaric acid, 15% adipic acid, 9% pimelic acid, 11% suberic and higher homologous dibasic acids, and 13% impurities. It had neutralization number of 770.

A portion, 50 grams, of these recovered crude ion-exchanged acids was mixed with 200 ml. of orthodichlorobenzene, and the mixture subjected to distillation treatment in the same manner as described in Example 2 for converting the succinic acid into succinic anhydride. A total of 75 ml. of distillate was collected, the distillate temperature range being 77–166° C., the distilland temperature range being 180–183° C. This distilland was cooled to about 0° C. and filtered to yield 31.1 grams of brownish, crystalline solids. A portion of 10 grams of these brownish solids was extracted two times each with a 10 gram portion of liquid $SO_2$ refluxing at atmospheric pressure. The resulting $SO_2$-insoluble product was a white powder of purified dibasic acids substantially free of succinic anhydride.

*Example 6*

The following operation illustrates the use of a low boiling water-entraining agent for converting succinic acid into succinic anhydride according to the precepts of my process. A mixture of 1000 ml. of benzene and 100 grams of succinic acid was maintained at total reflux under autogeneuos pressure in a stainless steel autoclave equipped with a vapor line, a reflux condenser, and a separator for water removal from the condensate. Distilland temperature was 350–400° F., and the distillation was run for about 1½ hours. The distilland, after cooling to room temperature, was filtered of solids which had a neutralization number of 1028 by method (a) in the foregoing table, this indicating that about 49% conversion of the succinic acid to succinic anhydride was accomplished under the foregoing conditions. By continuing such dehydration with the same or a higher boiling water-entraining agent substantially all the water of succinic acid dehydration to its anhydride can be released. This kind of dehydration can, of course, be applied also to acid mixtures such as those in Example 5, then followed by precipitation of solids from the cooled resulting distilland, and lixiviating such precipitated solids with liquid $SO_2$ to purify them and remove the resulting succinic anhydride.

Obviously, many modifications and variations of the invetnion, as hereinbefore set forth, may be made without departing from the spirit and scope thereof, and therefore only such limitations should be imposed as are indicated in the appended claims.

I claim:

1. A process for removing succinic anhydride from a mixture thereof containing succinic anhydride and at least one dibasic acid of the formula $$HOOC-(CH_2)_n-COOH$$

where $n$ is an integer having a value of at least 2 which comprises lixiviating said mixture with liquid phase sulfur dioxide, and separating the resulting lixivium containing succinic anhydride from the remaining solid phase material containing said dibasic acid.

2. The process of claim 1 where there are 1 to 20 parts by weight of sulfur dioxide per part of succinic anhydride present, and the lixiviation is done at temperature between about minus 30° and about plus 100° F.

3. A process for removing succinic acid from a mixture containing succinic acid and higher dibasic acids of the formula $HOOC-(CH_2)_m-COOH$ where $m$ is an integer having a value of at least 3 which comprises: forming a distilland of said mixture and an inert, water-immiscible, liquid phase water-entraining agent, said agent being capable of dissolving at least about 5 grams of succinic acid per 100 grams of the agent at a temperature in the range of 175°–220° C.; maintaining distillation of said entraining agent and water from said distilland at a temperature between about 175° and 220° C. until evolution of water from said distilland substantially ceases, thereby forming succinic anhydride from the succinic acid originally present in said distilland; recovering from the resulting distillation residue a solid phase mass of succinic anhydride and higher molecular weight dibasic acids; lixiviating the recovered solid phase mass with liquid phase $SO_2$; and separating the lixivium containing succinic anhydride from the remaining solid phase material containing higher molecular weight dibasic acids.

4. The process of claim 3 wherein the mixture of succinic and higher dibasic acids is the product of oxidizing paraffinic hydrocarbon, the proportion of water-entraining agent to said mixture is between 1:1 and 7:1, the distillation residue is cooled to a temperature from minus 20 to plus 100° F. for precipitation of said solid phase mass, and from 1 to 20 parts by weight of liquid phase $SO_2$ per part of recovered solid phase mass is used in said lixiviation at temperatures between about minus 30° F. and about 100° F. whereby practically all the succinic anhydride, and oxygenated impurities, are removed to provide a remaining solid phase containing glutaric and higher dibasic acids in purified form.

5. The process of claim 3 wherein the water-entraining agent is orthodichlorobenzene.

6. The process of claim 3 wherein the water-entraining agent is an alkylbenzene.

7. The process of claim 3 wherein the water-entraining agent is benzene.

References Cited in the file of this patent

UNITED STATES PATENTS

| 2,365,290 | Price et al. | Dec. 19, 1944 |
| 2,716,133 | Pooler | Aug. 23, 1955 |
| 2,794,831 | McKinnis | June 4, 1957 |

FOREIGN PATENTS

| 524,440 | Canada | May 1, 1956 |

OTHER REFERENCES

Noller: "Chemistry of Organic Compounds," 1951, pp. 731 to 734 and 63 to 64.